United States Patent
Ni et al.

(10) Patent No.: US 11,971,777 B1
(45) Date of Patent: Apr. 30, 2024

(54) METHOD, DEVICE, AND COMPUTER PROGRAM PRODUCT FOR FAULT DIAGNOSIS

(71) Applicant: Dell Products L.P., Round Rock, TX (US)

(72) Inventors: Jiacheng Ni, Shanghai (CN); Jinpeng Liu, Shanghai (CN); Zijia Wang, WeiFang (CN); Zhen Jia, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 25 days.

(21) Appl. No.: 17/990,885

(22) Filed: Nov. 21, 2022

(30) Foreign Application Priority Data

Oct. 17, 2022 (CN) .......................... 202211268277.3

(51) Int. Cl.
*G06F 11/07* (2006.01)
*G06N 5/04* (2023.01)

(52) U.S. Cl.
CPC ............. *G06F 11/079* (2013.01); *G06N 5/04* (2013.01)

(58) Field of Classification Search
CPC ................................ G06F 11/079; G06N 5/04
See application file for complete search history.

(56) References Cited

U.S. PATENT DOCUMENTS

| | | | |
|---|---|---|---|
| 9,245,232 B1 | 1/2016 | Trautmann et al. | |
| 10,019,716 B1 | 7/2018 | Ainslie et al. | |
| 10,410,219 B1 | 9/2019 | El-Nakib | |
| 10,860,071 B2* | 12/2020 | Munjal | G06F 11/3006 |
| 11,004,005 B1 | 5/2021 | Sirois | |
| 11,388,244 B1 | 7/2022 | Ni et al. | |
| 11,521,087 B2 | 12/2022 | Ni et al. | |
| 11,720,435 B2* | 8/2023 | Park | G06F 11/0736 |
| | | | 714/37 |

(Continued)

FOREIGN PATENT DOCUMENTS

| | | |
|---|---|---|
| CN | 110363556 A | 10/2019 |
| CN | 112053703 A | 12/2020 |

(Continued)

OTHER PUBLICATIONS

J. Devlin et al., "BERT: Pre-training of Deep Bidirectional Transformers for Language Understanding," arXiv:1810.04805v2, May 24, 2019, 16 pages.

(Continued)

*Primary Examiner* — Jigar P Patel
(74) *Attorney, Agent, or Firm* — Ryan, Mason & Lewis, LLP

(57) ABSTRACT

A method in an illustrative embodiment of the present disclosure includes determining, utilizing a first diagnosis model deployed in a storage system, whether a cause of a fault belongs to environmental factors. The method further includes determining, responsive to determining that the cause of the fault belongs to the environmental factors, whether the fault can be solved locally in the storage system. The method further includes sending, responsive to determining that the fault cannot be solved locally in the storage system, the fault to a second diagnosis model, wherein the first diagnosis model is obtained by distilling the second diagnosis model. According to the method for fault diagnosis of the present disclosure, particular faults can be diagnosed and solved locally in a storage system, so that the workload of a customer support team of the storage system in a cloud can be reduced.

20 Claims, 7 Drawing Sheets

(56) References Cited

U.S. PATENT DOCUMENTS

| | | | |
|---|---|---|---|
| 11,789,802 B2 * | 10/2023 | Bhatnagar | H04L 41/40 |
| | | | 714/37 |
| 2016/0169771 A1 * | 6/2016 | Hiruta | G01M 15/14 |
| | | | 702/183 |
| 2018/0253735 A1 | 9/2018 | Bedoun et al. | |
| 2019/0034937 A1 | 1/2019 | Zhang et al. | |
| 2019/0286486 A1 | 9/2019 | Ma et al. | |
| 2020/0241861 A1 | 7/2020 | Zhang et al. | |
| 2020/0334416 A1 * | 10/2020 | Vianu | G06V 10/764 |
| 2021/0142212 A1 | 5/2021 | Li et al. | |
| 2021/0406730 A1 | 12/2021 | Ni et al. | |
| 2022/0092441 A1 * | 3/2022 | Zhu | G16H 80/00 |

FOREIGN PATENT DOCUMENTS

| | | |
|---|---|---|
| CN | 108958939 B | 12/2021 |
| CN | 113868368 A | 12/2021 |

OTHER PUBLICATIONS

A. Vaswani et al., "Attention is All You Need," arXiv:1706.03762v5, 31st Conference on Neural Information Processing Systems, Dec. 6, 2017, 15 pages.

G. Neubig, "Neural Machine Translation and Sequence-to-sequence Models: A Tutorial," arXiv:1703.01619v1, Mar. 5, 2017, 65 pages.

S. Mani et al., "DeepTriage: Exploring the Effectiveness of Deep Learning for Bug Triaging," arXiv:1801.01275v1, Jan. 4, 2018, 11 pages.

T. Mikolov et al., "Efficient Estimation of Word Representations in Vector Space," arXiv:1301.3781v3, Sep. 7, 2013, 12 pages.

G. S. Manku et al., "Detecting Near-Duplicates for Web Crawling," Proceedings of the 16th International Conference on World Wide Web. May 8-12, 2007, 9 pages.

* cited by examiner

METHOD, DEVICE, AND COMPUTER PROGRAM PRODUCT FOR FAULT DIAGNOSIS

RELATED APPLICATION

The present application claims priority to Chinese Patent Application No. 202211268277.3, filed Oct. 17, 2022, and entitled "Method, Device, and Computer Program Product for Fault Diagnosis," which is incorporated by reference herein in its entirety.

FIELD

Embodiments of the present disclosure generally relate to the field of data storage technologies, and more specifically, to a method, a device, and a computer program product for fault diagnosis.

BACKGROUND

With the continuous development of information technologies and networks, storage systems have been more widely used. During the use of a storage system, various faults may occur for various reasons. Handling of these various faults may consume substantial amounts of time and energy of a customer support team of a storage system manufacturer.

Among these various faults, some are caused by environmental factors (such as network disconnection, disk damage, power fault, etc.), and these faults can be easily solved locally in the storage system.

SUMMARY

Embodiments of the present disclosure provide a method, a device, and a computer program product for fault diagnosis.

In a first aspect of the present disclosure, a method for fault diagnosis is provided. The method includes: determining, utilizing a first diagnosis model deployed in a storage system, whether a cause of a fault belongs to environmental factors; determining, responsive to determining that the cause of the fault belongs to environmental factors, whether the fault can be solved locally in the storage system; and sending, responsive to determining that the fault cannot be solved locally in the storage system, the fault to a second diagnosis model, wherein the first diagnosis model is obtained by distilling the second diagnosis model.

In another aspect of the present disclosure, an electronic device is provided. The device includes a processing unit and a memory, wherein the memory is coupled to the processing unit and has instructions stored therein. The instructions, when executed by the processing unit, cause the electronic device to perform the following actions: determining, utilizing a first diagnosis model deployed in a storage system, whether a cause of a fault belongs to environmental factors; determining, responsive to determining that the cause of the fault belongs to environmental factors, whether the fault can be solved locally in the storage system; and sending, responsive to determining that the fault cannot be solved locally in the storage system, the fault to a second diagnosis model, wherein the first diagnosis model is obtained by distilling the second diagnosis model.

In still another aspect of the present disclosure, a computer program product is provided. The computer program product is tangibly stored on a non-transitory computer-readable medium and includes computer-executable instructions, wherein the computer-executable instructions, when executed by a computer, cause the computer to perform the method or process according to embodiments of the present disclosure.

This Summary is provided to introduce relevant concepts in a simplified manner, which will be further described in the Detailed Description below. The Summary is neither intended to identify key features or essential features of the present disclosure, nor intended to limit the scope of embodiments of the present disclosure.

BRIEF DESCRIPTION OF THE DRAWINGS

By description of example embodiments of the present disclosure, provided in more detail herein with reference to the accompanying drawings, the above and other objectives, features, and advantages of the present disclosure will become more apparent. In the example embodiments of the present disclosure, the same reference numerals generally represent the same elements.

DETAILED DESCRIPTION

Figure 1:
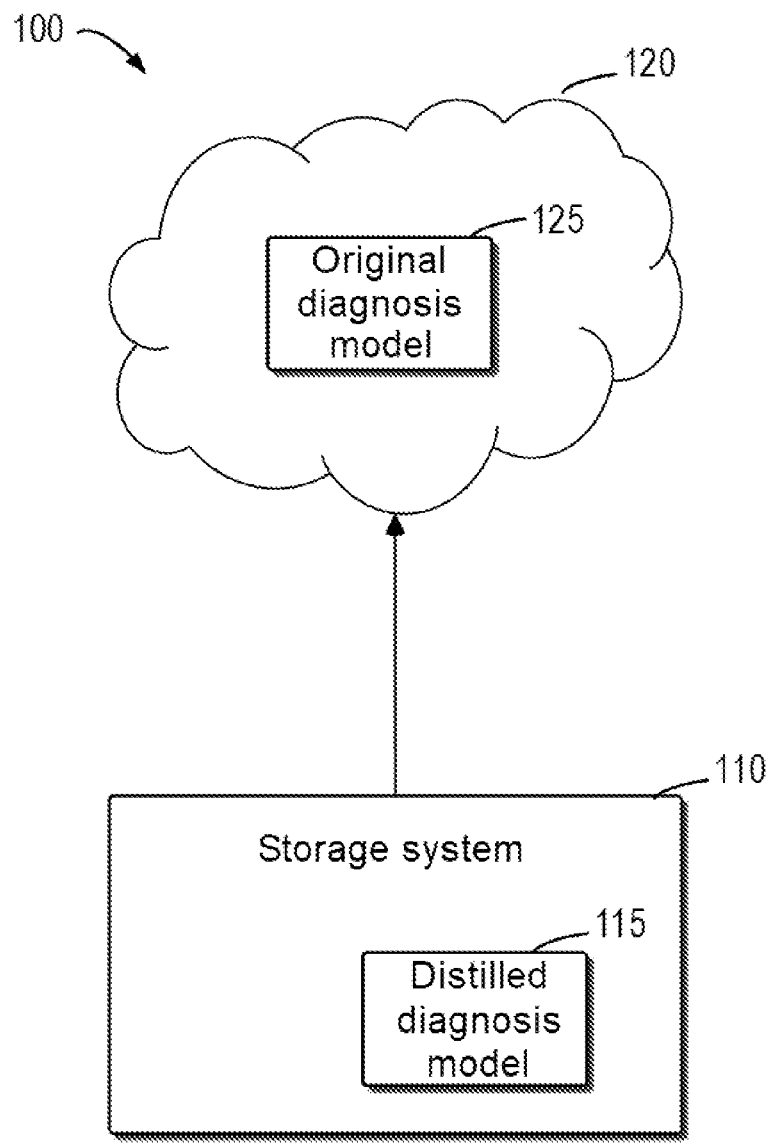
FIG. 1 shows a schematic diagram of an example environment of a storage system according to an embodiment of the present disclosure.

Illustrative embodiments of the present disclosure will be described in more detail below with reference to the accompanying drawings. Although some embodiments of the present disclosure are shown in the accompanying drawings, it should be understood that the present disclosure may be implemented in various forms, and should not be limited to the embodiments set forth herein. Rather, these embodiments are provided to make the present disclosure more thorough and complete and to fully convey the scope of the present disclosure to those skilled in the art.

The term "include" and variants thereof used in this text indicate open-ended inclusion, that is, "including but not limited to." Unless specifically stated, the term "or" means "and/or." The term "based on" means "based at least in part on." The terms "an example embodiment" and "an embodiment" indicate "at least one example embodiment." The term "another embodiment" indicates "at least one additional embodiment." The terms "first," "second," and the like may refer to different or identical objects, unless it is clearly stated that the terms refer to different objects.

During the use of a storage system, various faults may occur for various reasons. These various faults may be caused by software defects, hardware or network problems, or operation mistakes by customers. These various faults will be reported to a customer support team as service requests (SRs) of customers for processing, which may consume substantial amounts of time and energy of the customer support team for diagnosing causes of the faults and performing targeted troubleshooting operations.

Among these various faults, some are caused by environmental factors (such as network disconnection, disk damage, power fault, etc.), and solutions for these problems are direct and easy for operation (for example, first check the environment and then restart the system). Therefore, urgent technical problems to be solved are how to use artificial intelligence technologies to enable a storage system itself to have an ability of pre-diagnosis to quickly screen out faults caused by environmental factors so as to quickly solve the faults caused by environmental factors locally in the storage system and respond to a customer's problem quickly and reduce the workload of the customer support team, which allows the customer support team to focus on faults related to the storage system itself.

Hence, embodiments of the present disclosure provide a diagnosis system with a 2-layer architecture. The diagnosis system with a 2-layer architecture includes a local pre-diagnosis system executed in a storage system locally by a customer IT engineer and a diagnosis system deployed in a cloud and executed on the cloud by a customer support team of the manufacturer of the storage system, where the local pre-diagnosis system deployed in the storage system is obtained by distilling the diagnosis system deployed in the cloud. In this way, faults caused by environmental factors can be locally solved in the storage system quickly, so that the workload of the customer support team of the manufacturer of the storage system can be reduced, and response capabilities to customers can be improved.

It should be understood that although a semantic representation model-based diagnosis model is used in some embodiments of the present disclosure as an example of the diagnosis model deployed in the cloud and as an example of the distilled model, the semantic representation model-based diagnostic model can be replaced by or used in conjunction with any known or future-developed diagnostic model. In some embodiments of the present disclosure, a BERT-based Triage Model (BTM) is an example of the semantic representation model-based diagnostic model, where the BERT (Bidirectional Encoder Representations from Transformer) is an example of the semantic representation model. Alternatively, other existing or future-developed semantic representation models may be used to implement identical or similar functions. The semantic representation model described in the present disclosure is not limited to the BERT.

The basic principles and some example implementations of the present disclosure are illustrated below with reference to FIG. 1 to FIG. 6. It should be understood that these example embodiments are given only to enable those skilled in the art to better understand and thus implement embodiments of the present disclosure, and are not intended to limit the scope of the present disclosure in any way.

FIG. 1 is a schematic diagram of example environment 100 of a storage system according to an embodiment of the present disclosure. As shown in FIG. 1, in example environment 100, original diagnosis model 125 is deployed in cloud 120. Distilled diagnosis model 115 is deployed in storage system 110.

In some embodiments, distilled diagnosis model 115 is obtained by distilling original diagnosis model 125. When a fault occurs to storage system 110 during use, distilled diagnosis model 115 determines whether the fault can be locally solved in storage system 110 first. For example, distilled diagnosis model 115 determines whether a cause of the fault belongs to environmental factors (such as network disconnection, disk damage, power fault, etc.), that is, determines whether the fault is caused by environmental factors. If the cause of the fault belongs to environmental factors, that is, if the fault can be locally solved in storage system 110, an attempt to eliminate the fault locally in storage system 110 may be made. If the fault can be eliminated locally in storage system 110, the fault will not be submitted to original diagnosis model 125 deployed in cloud 120 and not processed by the customer support team of the manufacturer of storage system 110, thereby improving the efficiency of eliminating faults and reducing the workload of the customer support team of the manufacturer of storage system 110.

If distilled diagnosis model 115 determines that the cause of the fault does not belong to environmental factors, or the cause of the fault belongs to environmental factors but the fault cannot be locally eliminated in storage system 110, the fault will be submitted to original diagnosis model 125 deployed in cloud 120 for processing by the customer support team of the manufacturer of storage system 110.

In this way, compared with a situation where all faults of storage system 110 are submitted to original diagnosis model 125 deployed in cloud 120 for processing by the customer support team of the manufacturer of storage system 110, faults caused by environmental factors can be pre-diagnosed by distilled diagnosis model 115 locally deployed in storage system 110 and directly solved locally, instead of being submitted to original diagnosis model 125 deployed in cloud 120 for processing by the customer support team of the manufacturer of storage system 110, thereby improving the efficiency of eliminating faults and reducing the workload of the customer support team of the manufacturer of storage system 110.

Figure 2:
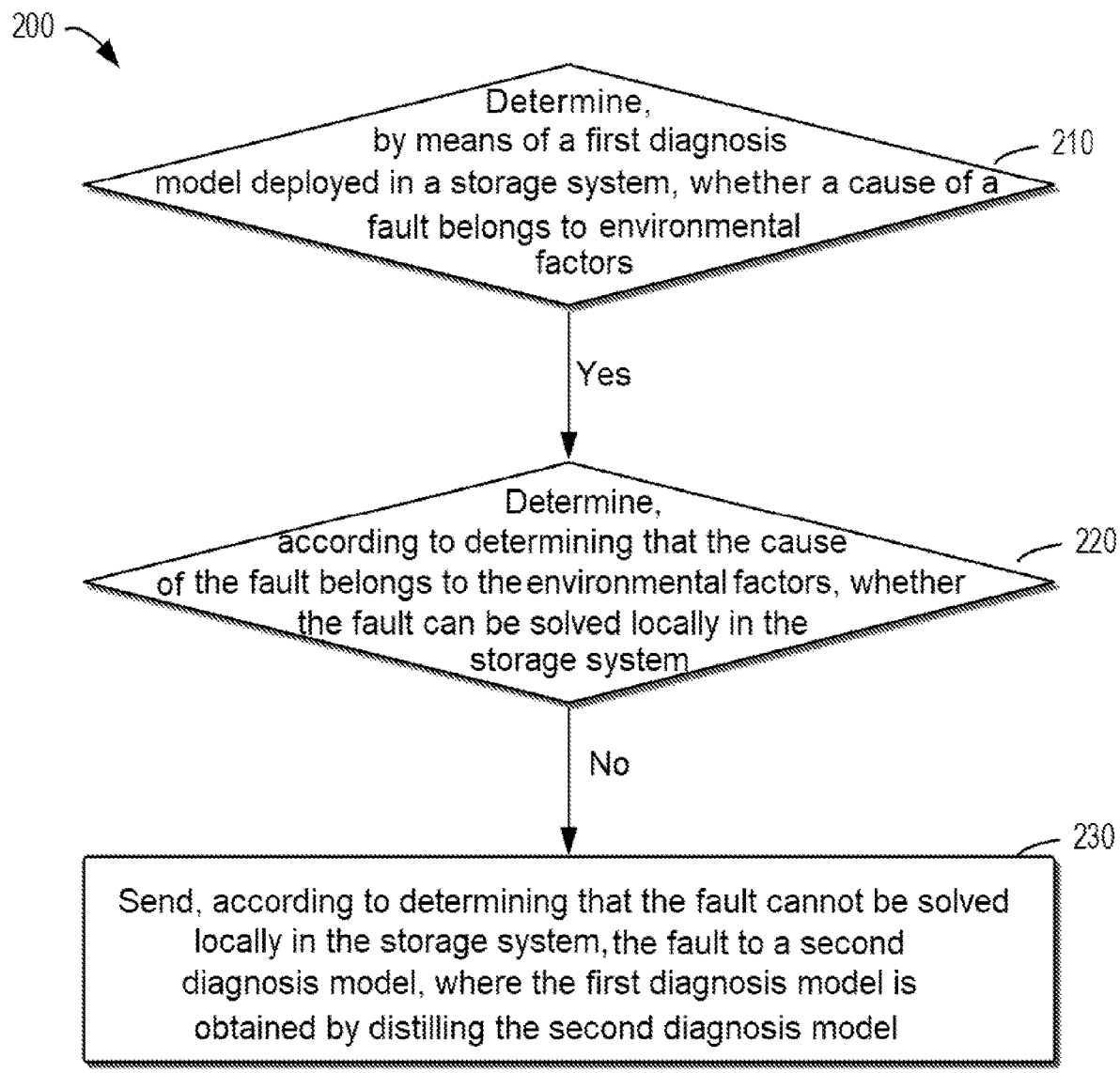
FIG. 2 is a flow chart of an example method for fault diagnosis according to an embodiment of the present disclosure.

FIG. 2 is a flow chart of example method 200 for fault diagnosis according to an embodiment of the present disclosure. Example method 200 is described below with reference to FIG. 1 as well as FIG. 2.

As shown in FIG. 2, in example method 200, at 210, it is determined whether a cause of a fault belongs to environmental factors by means of or otherwise utilizing a first diagnosis model deployed in a storage system.

For example, with reference to FIG. 1, it can be determined whether a cause of a fault belongs to environmental factors utilizing distilled diagnosis model 115 (equivalent to the first diagnosis model) deployed in storage system 110. The environmental factors are factors such as network disconnection, disk damage, and power fault that may cause faults to storage system 110 and can be fixed locally in storage system 110.

An affirmative determination at 210 results in the method 200 proceeding to 220 as shown in the figure. At 220, it is determined, according to or otherwise responsive to determining that the cause of the fault belongs to environmental factors in 210, whether the fault can be locally solved in the storage system.

For example, with reference to FIG. 1, if it is determined at 210 that the cause of the fault belongs to environmental factors (such as network disconnection), it may be further determined at 220 whether the fault can be locally solved in storage system 110 (for example, whether the fault can be eliminated by connecting to a network locally in storage system 110). If it is determined at 210 that the cause of the fault does not belong to environmental factors, the fault will be submitted to original diagnosis model 125 (the second diagnosis model) deployed in cloud 120 for diagnosis.

A negative determination at 220 results in the method 200 proceeding to 230 as shown in the figure. At 230, the fault is sent to the second diagnosis model according to or otherwise responsive to determining that the fault cannot be solved locally in the storage system, where the first diagnosis model is obtained by distilling the second diagnosis model.

For example, with reference to FIG. 1, if it is determined at 210 and 220 that the cause of the fault belongs to environmental factors but an attempt to solve the fault in storage system 110 locally failed, then at 230, the fault is sent to original diagnosis model 125 (equivalent to the second diagnosis model) deployed in cloud 120 for subsequent diagnosis.

In some embodiments, the second diagnosis model is generated by pre-training a service request utilizing a Masked Language Model (MLM) and fine tuning the service request marked by a knowledge base, and is deployed in the cloud. Further details on this point will be described later with reference to FIGS. 3A and 3B.

In some embodiments, the second diagnosis model is based on a semantic representation model, where the semantic representation model is based on a Transformer model. For example, as shown in FIG. 1, original diagnosis model 125 is based on a semantic representation model, and the semantic representation model is based on a Transformer model. For example, the semantic representation model may be a BERT (Bidirectional Encoder Representations from Transformer) model.

In some embodiments, determining whether the cause of the fault belongs to environmental factors may include generating a whitelist of environmental factors causing faults during the distillation of the first diagnosis model from the second diagnosis model. Determining whether the cause of the fault belongs to environmental factors may further include searching the whitelist for the cause of the fault. For example, as shown in FIG. 1, during the distillation of original diagnosis model 125 for obtaining distilled diagnosis model 115, a whitelist of environmental factors causing faults may be generated, and the whitelist may be searched for the cause of the fault.

In some embodiments, if it is determined at 220 that the fault can be solved locally in storage system 110, the fault is solved locally in storage system 110, and storage system 110 is reset.

Figure 3A:
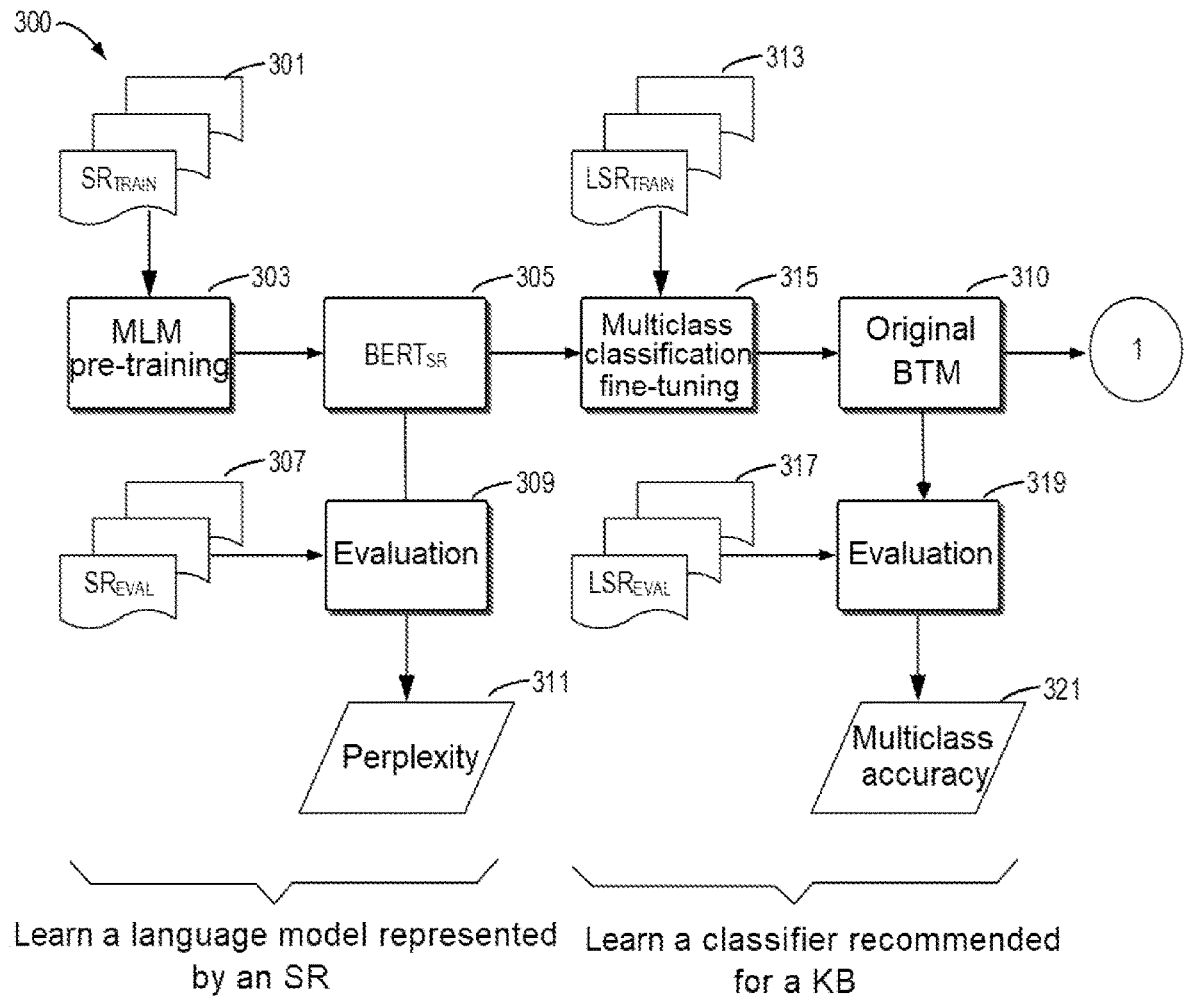
FIG. 3A is a schematic diagram of an example method for fault diagnosis according to an embodiment of the present disclosure.

FIG. 3A is a schematic diagram of example method 300 for fault diagnosis according to an embodiment of the present disclosure. FIG. 3A is illustrated with reference to FIGS. 1 and 2. As shown in example method 300 of FIG. 3A, a BERT model is used to process a service request (SR) from a user of a storage system (that is, a customer) (the architecture of the BERT model will be described in detail later with reference to FIG. 4). Firstly, at 303, SR training data set $SR_{TRAIN}$ 301 input to a Masked Language Model (MLM), and the MLM is pre-trained (the MLM will be described in detail later with reference to FIG. 5) to obtain SR-based BERT model $BERT_{SR}$ 305. At 309, $BERT_{SR}$ 305 is used to evaluate SR evaluation data set $SR_{EVAL}$ 307 to obtain perplexity 311. In this way, a language model represented by an SR is learned.

Then at 315, SR-based BERT model $BERT_{SR}$ 305 is used to perform multi-class classification and fine-tuning on an SR training set labeled with a knowledge base (KB), that is, LSR (SR labeled with KB) training data set $LSR_{TRAIN}$ 313 so as to obtain original BTM 310. At 319, based on original BTM 310, LSR evaluation data set $LSR_{EVAL}$ 317 is evaluated to obtain multi-class accuracy 321. In this way, a classifier recommended for the knowledge base is learned.

Original BTM 310 may be taken as a knowledge base prediction model of a diagnosis system, which is equivalent to original diagnosis model 125 in FIG. 1 and/or second diagnosis model in FIG. 2.

Figure 3B:
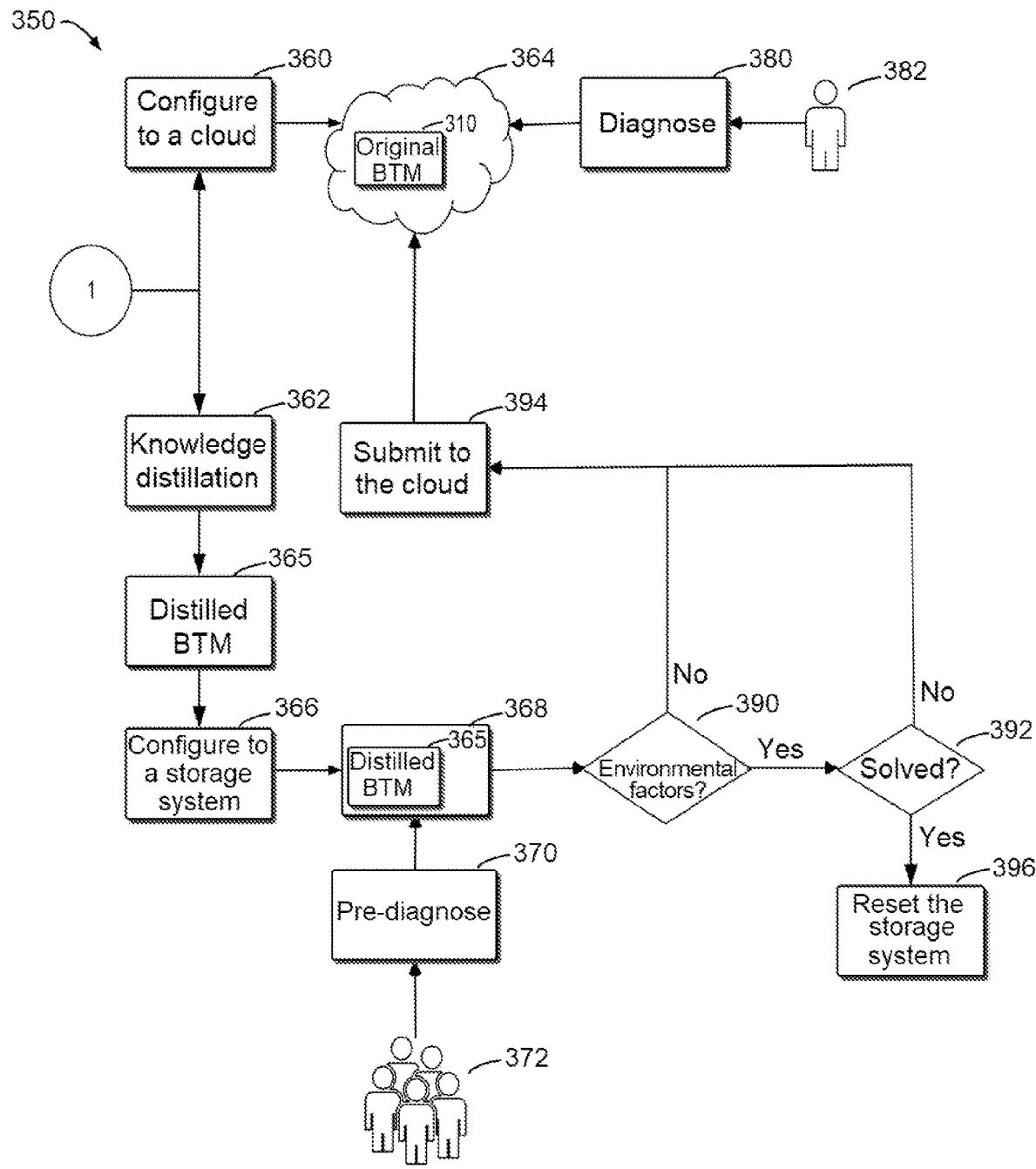
FIG. 3B is a schematic diagram of an example method for fault diagnosis according to an embodiment of the present disclosure.

FIG. 3B is a schematic diagram of example method 350 for fault diagnosis according to an embodiment of the present disclosure. FIG. 3B is illustrated with reference to FIGS. 1, 2, and 3A. As shown in example method 350 of FIG. 3B, original BTM 310 obtained utilizing example method 300 shown in FIG. 3A is configured at 360 to cloud 364. Cloud 364 is equivalent to cloud 120 shown in FIG. 1 and may include any public cloud, private cloud or hybrid cloud, community cloud, distributed cloud, inter-cloud, multi-cloud, or any combination of them.

Moreover, original BTM 310 obtained utilizing example method 300 shown in FIG. 3A is distilled at 362 utilizing knowledge distillation technology so as to obtain a distilled model, that is, distilled BTM 365 (such as distilled diagnosis model 115 in FIG. 1 and/or the first diagnosis model in FIG. 2).

In an embodiment of the present disclosure, the knowledge distillation technology often adopts a Teacher-Student architecture, which is a process of migrating knowledge from a large model (which is also referred to as "teacher model") to a small model (which is also referred to as "student model"). Although a large model (such as a very deep neural network or an integration of many models) has higher knowledge capacity than a small model, this capacity may not be fully utilized. Knowledge distillation migrates knowledge from a large model to a small model without losing the validity of knowledge. Due to the low cost of evaluation for small models, a small model can be deployed on hardware with low functionality (such as mobile devices). Knowledge distillation has been successfully applied to several applications of machine learning, such as object detection and acoustic model and natural language processing, and has also been introduced into graphical neural networks for non-grid data. As for the knowledge distillation technology used in knowledge distillation at 362, any existing and possible future knowledge distillation technology that can realize the distillation of original BTM 310 can be used.

For example, compared with original BTM 310, distilled BTM 365 may reduce the size by 70% while retaining 95% of the language understanding capabilities (when N<=3, wherein N represents the number of the first N values in a softmax distribution), and improving the processing speed by 80%. It means that original BTM 310 is compressed into a compact model, that is, distilled BTM 365, utilizing the knowledge distillation technology, and distilled BTM 365 can retain almost most language processing capabilities of original BTM 310, significantly reducing the size, and improving the processing speed.

Then, distilled BTM 365 is configured at 366 to storage system 368. When a fault occurs to storage system 368 during use, customer IT support staff 372 may first pre-diagnose at 370 the cause of the fault locally in the storage system 368 utilizing distilled BTM 365 configured in storage system 368. Alternatively, a customer runs a DAEMON program installed locally in storage system 368 to monitor running logs of storage system 368, and if any abnormal condition is found, distilled BTM 365 is automatically started to pre-diagnose the cause of the fault without the intervention of customer IT support staff 372. Alternatively, storage system 368 is attached with the DAEMON program for monitoring running conditions of storage system 368. If storage system 368 is started, the attached DAEMON program is also started at the same time to monitor running logs of storage system 368. If any abnormal condition is found, distilled BTM 365 is automatically started to pre-diagnose the cause of the fault without the intervention of customer IT support staff 372, where the DAEMON program is a software program for detecting running conditions of storage system 368.

At 390, it is determined utilizing distilled BTM 365 whether a cause of a fault belongs to environmental factors. If distilled BTM 365 determines that the cause of the fault belongs to environmental factors (such as network disconnection, disk damage, power fault, etc.), customer IT support staff 372 may directly operate locally in the memory (for example, connect to a network, change a disk, and connect to backup power supply) to fix the fault. For example, if the cause of the fault is network disconnection, since network disconnection belongs to environmental factors, at 390, the cause of the fault is determined to belong to environmental factors (yes). In this case, customer IT support staff 372 may directly eliminate the fault locally (that is, connect storage system 368 to a network), and at 392, further determine whether the fault is solved. Alternatively, if the DAEMON program is adopted to monitor running conditions of storage system 368, the DAEMON program may prompt the customer IT support staff 372 (or a system administrator) with alarm information or send an email to remind them after finding abnormal conditions (i.e., faults). The alarm information may be pop-up windows on a visual desktop of storage system 368 to display general phenomena, cause, and solutions of the fault, or customer IT support staff 372 may be prompted utilizing on, off, or flashing of an indicator light that a fault occurs to storage system 368, or voice alerts may also be used to prompt customer IT support staff 372 of a fault to storage system 368 and suggest how to solve it. If the DAEMON program automatically sends an email to customer IT support staff 372 to remind them, the email content may include general phenomena, cause, and solutions of the fault. The timing of sending the email may be set by customer IT support staff 372. For example, the email may be sent instantly after a fault is found, or reports of all faults whose causes are determined to belong to environmental factors are sent to customer IT support staff 372 at a specified time of each day, for example, every 4 hours. After seeing or hearing the alarm information or receiving the alarm e-mail automatically sent by the DAEMON program, customer IT support staff 372 can take targeted measures, such as directly eliminating the fault locally and further determining whether the fault has been solved. These measures are as mentioned above, and will not be repeated here.

If the cause of the fault is that storage space overflows, since overflow of storage space does not belong to environmental factors, then at 390, distilled BTM 365 determines that the cause of the fault does not belong to environmental factors (no). In this case, at 394, the fault is submitted to cloud 364, so that customer support team 382 of the manufacturer of storage system 368 further diagnoses the cause of the fault at 380. The operation of submitting the fault may be manually accomplished by customer IT support staff 372 or automatically accomplished by the DAEMON program. For example, the DAEMON program may submit reports of all faults whose causes are determined to not belong to environmental factors to cloud 364 at a specified time of each day or each week (the specified time may also be pre-configured by customer IT support staff 372 or configured by storage system 368 or the DAEMON program by default), for example, every 2 hours.

Still referring to FIG. 3B, it is further determined at 392 whether the fault has been solved. For illustrative purposes, the above-described example is further adopted. If the cause of the fault is network disconnection, customer IT support staff 372 may determine, by checking a network connection indicator, whether storage system 368 has been connected to a network, or customer IT support staff 372 may determine, utilizing instructions like ping commands, whether it has been connected to a network, or may also determine, utilizing functions implemented in distilled BTM 365, whether storage system 368 has been connected to a network. The method of determining whether it has been connected to a network is not the focus of the present disclosure, and will not be repeated here.

At 392, once it is determined that the fault has been solved (yes), at 396, customer IT support staff 372 may reset storage system 368, so that storage system 368 after reset can normally work. Alternatively, distilled BTM 365 has a function of determining whether the fault has been solved, and once it is determined that the fault has been solved (yes), the storage system 368 is automatically reset.

At 392, if it is determined that the fault has not been solved (no), then at 394, customer IT support staff 372 may submit a report of the fault to cloud 364. Cases where the fault is not solved include, but are not limited to, the following situations: distilled BTM 365 performs pre-diagnosis at 370 and determines that the cause of the fault belongs to environmental factors, however, the fault is not solved utilizing local operations in storage system 368.

At 380, customer support team 382 of the manufacturer of the storage system diagnoses the fault report submitted to cloud 364 utilizing original BTM 310 deployed in cloud 364.

In some embodiments, data can be prepared first. For example, log files collected by a customer service system are obtained. A service request (SR) submitted by a customer includes a title and description. When a SR is located and solved, after an appropriate knowledge base (KB) is attached to the SR, for example, an index to the KB being attached to the SR, that is, the SR includes an index to the KB. The KB stores knowledge references for fixing faults. Not all the SRs have corresponding KBs; if the SR does not have a corresponding KB, "NA" may be used to represent an index to a KB. Therefore, it may be determined based on the service request whether a cause of a fault belongs to environmental factors. Specifically, for example, it can be determined based on the KB whether the fault can be solved locally in the storage system.

When processing the SR, the title and description thereof are concatenated into a document as an input. All words in the title and description are converted into lower case, and punctuation marks are removed. The entire log data set is separated into a training data set and an evaluation data set according to a creation timestamp of the SR (referring to FIG. 3A and corresponding descriptions thereof). All titles and descriptions in the SR training data set ($SR_{TRAIN}$) are used as a corpus for training language models. The language models are evaluated for perplexity on the SR evaluation data set ($SR_{EVAL}$). An SR (LSR) training data set ($LSR_{TRAIN}$) marked with a KB is used to fine tune a language model. A classifier performs evaluation on the LSR evaluation data set ($LSR_{EVAL}$) utilizing Top 1 and Top N multi-class precisions. The Top 1 precision refers to a maximum value extracted from a final softmax output in multi-class text classification problems, which corresponds to the confidence value of a text input prediction class. The Top N precision is used to measure the frequency (probability) of a labeled class falling in the top N values of the softmax distribution.

Then, a Masked Language Model (MLM) may be constructed to learn feature representations of the service request (SR). Regarding the MLM, reference may be made to FIG. 5 and the description thereof. A BERT base model ($BERT_{BASE}$) is applied, utilizing an MLM task, to an SR training data set ($SR_{TRAIN}$) which is used as a technique corpus to obtain a new language model, that is, an SR-based BERT model ($BERT_{SR}$), as shown in $BERT_{SR}$ 305 of FIG. 3A. Perplexity is a widely used measurement standard for comparing language models. Therefore, perplexity is used to evaluate $BERT_{BASE}$ and $BERT_{SR}$ on the SR evaluation data set ($SR_{EVAL}$). Results are shown in Table 1. Hence, compared with the $BERT_{BASE}$, the $BERT_{SR}$ may significantly reduce perplexity.

TABLE 1

Evaluation of Fine-tuned Language Model

| Corpus | Data Size | Perplexity |
| --- | --- | --- |
| Wiki + Book corpus | 16 GB | 58.3553 |
| $SR_{TRAIN}$ | 94 MB | 5.2453 |

During the process of fine-tuning a model, a classification layer is added before a Transformer output of a [CLS] token, and an SR-based BERT model ($BERT_{SR}$, such as $BERT_{SR}$ 305 in FIG. 3A) is fine-tuned on an LSR training data set ($LSR_{TRAIN}$, such as $LSR_{TRAIN}$ 313 in FIG. 3A). The result shows that an optimal precision may be achieved by fine tuning $BERT_{SR}$ on a labeled data set with a maximum sequence length of 512. Therefore, this configuration is finally determined as a BTM (BERT-based Triage Model). The BTM may be original diagnosis model 125 shown in FIG. 1, the second diagnosis model of FIG. 2, and original BTM 310 in FIG. 3.

The BTM is compressed into a compact model utilizing knowledge distillation. The method is as stated above. The original BTM is deployed to a cloud as a diagnosis tool of a technical support engineer (such as customer support team 382 shown in FIG. 3B) for processing a service request submitted by a customer, and the distilled BTM is deployed to a storage system product as a local pre-diagnosis tool of a customer IT support staff (such as customer IT support staff 372 shown in FIG. 3B).

If a fault occurs to the storage system product, a title and description of the fault is input to the local pre-diagnosis tool (the distilled BTM) to obtain a knowledge base prediction result. If the prediction result is reliable enough (for example, the confidence is greater than a first threshold, and the first threshold may be pre-specified) and the predicted knowledge base is easy and straightforward enough, a customer IT engineer may directly eliminate the fault locally in the storage system and restart the storage system product; therefore, the storage system product may normally work subsequently.

If the prediction result of the distilled BTM is not confident (for example, the confidence is lower than a second threshold, and the second threshold may be pre-specified), or the predicted knowledge base is relatively difficult or not straightforward enough for execution and cannot be executed locally by a customer IT supporter, or the customer IT supporter does not successfully eliminate the fault due to various reasons after obtaining the knowledge base, the problem is further addressed, for example, by filling out a customer service request and submitting the service request to the technical support engineer for further diagnosis. The technical support engineer may provide some suggestions by using the BTM.

Utilizing the method, a diagnosis system with a 2-layer architecture is provided. The diagnosis system with a 2-layer architecture includes a local pre-diagnosis system executed locally in a storage system by a customer IT supporter and a diagnosis system deployed in a cloud and executed by a technical support engineer of the manufacturer of the storage system, where the local pre-diagnosis system deployed in the storage system is obtained by distilling the diagnosis system deployed in the cloud. The local pre-diagnosis system includes, for example, distilled diagnosis model 115 shown in FIG. 1 (or the first diagnosis model of FIG. 2, or distilled BTM 365 shown in FIG. 3B), and the diagnosis system deployed in the cloud includes, for example, original diagnosis model 125 shown in FIG. 1 (or the second diagnosis model of FIG. 2, or original BTM 310 shown in FIGS. 3A and 3B). In this way, faults caused by environmental factors can be quickly screened out, so that the faults caused by environmental factors can be directly and quickly solved locally in the storage system, which can reduce the workload of the customer support team of the manufacturer of the storage system and improve response capabilities to customers.

Figure 4:
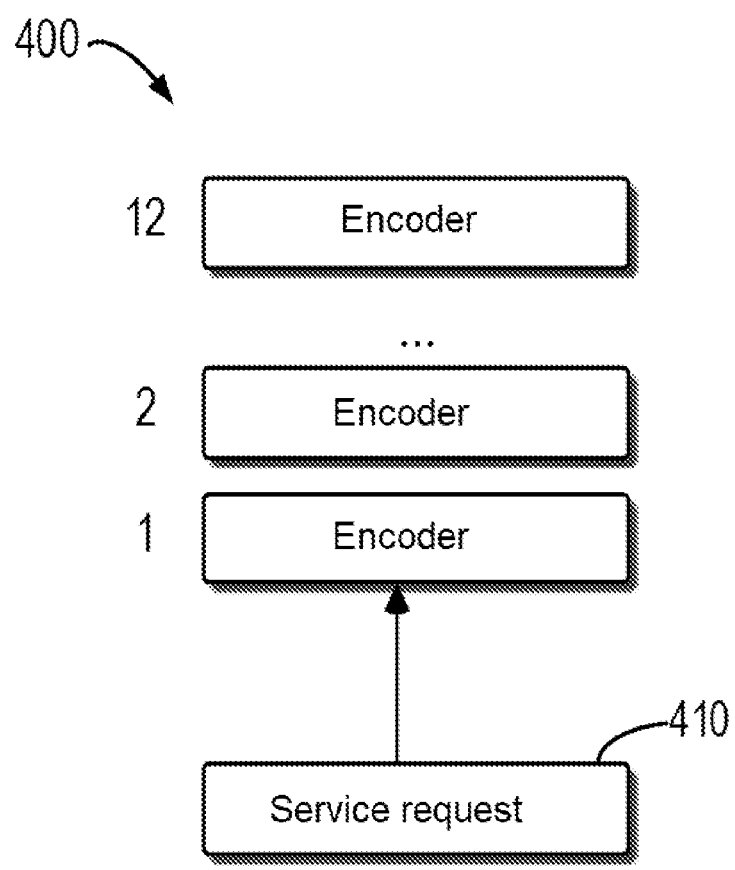
FIG. 4 is a schematic diagram of an example architecture of a semantic representation model used for fault diagnosis according to an embodiment of the present disclosure.

FIG. 4 is a schematic diagram of BERT architecture 400 used for fault diagnosis according to an embodiment of the present disclosure. BERT has shown an optimal result so far among various natural language processing (NLP) tasks, including text classification. The key technical innovation of BERT is to apply bidirectional training of Transformer (a popular attention model) to language modeling, and fine tune a language model for specific tasks.

A BERT model is formed by stacking several encoders. In an example shown in FIG. 4, the BERT model is formed by stacking 12 encoders. The quantity of the stacked encoders (in this example, 12 encoders) determines the quantity of parameters of the BERT model. An encoder of the Transformer reads the whole word sequence of at least a portion of a service request 410, and therefore, is considered to be bidirectional; that is, for each word in the word sequence, the word before it ("forward") and the word after it ("backward") are known. This feature allows a model to learn context of a word according to all environments (left and right sides of the word) of the word. In the BERT, an input is a token sequence, which is first embedded into a vector and then processed in the stacked encoders. An output is a vector sequence, where each vector corresponds to input tokens with the same indexes. Each input text begins with [CLS], and sentences are separated by [SEP]. From the perspective of application, when using the BERT to build a text classifier model, a relevant large-scale corpus is first used to pre-process the BERT in a semi-supervised manner, and then the labeled instances are fed back to the BERT for fine-tuning the BERT model.

Figure 5:
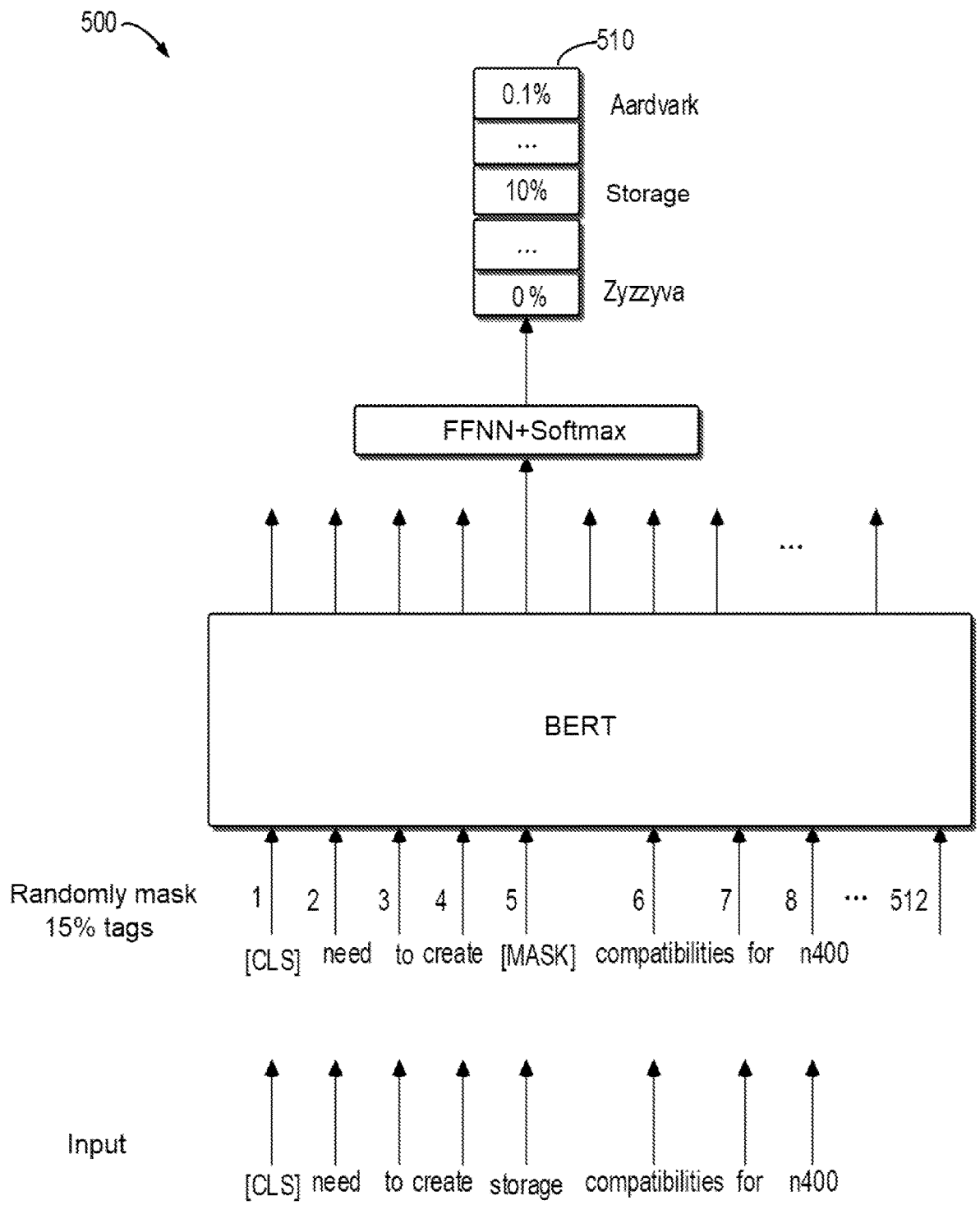
FIG. 5 is a schematic diagram of an example Masked Language Model (MLM) used for fault diagnosis according to an embodiment of the present disclosure.

FIG. 5 is a schematic diagram 500 of a Masked Language Model (MLM) used for fault diagnosis according to an embodiment of the present disclosure. In the stage of pre-training a BERT model, the Masked Language Model is trained together with a Next Sentence Prediction (NSP) model, aiming at minimizing a combined loss function of the two strategies. In the Masked Language Model, before inputting a word sequence to the BERT, 15% of the words in each sequence are replaced with [MASK] tags. The model then attempts to predict an original value of a masked word based on the context provided by other unmasked words in the sequence. For the prediction of output words, a classification layer is added before the output of an encoder, an output vector is multiplied by an embedding matrix and converted into a vocabulary dimension, and the probability of each word in the vocabulary is calculated utilizing softmax.

For example, as shown in FIG. 5, a word sequence as an input, illustratively using a subset of BERT inputs denoted 1, 2, 3, 4, 5, 6, 7, 8, . . . 512, is "need to create storage compatibilities for n400." Before inputting the word sequence to the BERT, 15% of the words in the word sequence are replaced with [MASK] tags. For example, suppose the word "storage" therein is replaced with a [MASK] token, the MLM model then attempts, by using the location of the output masked word, to predict the original value of the masked word (in this case, "storage") based on the context provided by other unmasked words in the sequence (in this example, "need," "to," "create," "compatibilities," "for," and "n400").

In this example, a classification layer is added before the output of the encoder (for the BERT architecture, refer to FIG. 4). Moreover, the output vector is multiplied by an embedding matrix and converted into a vocabulary dimension, and the probability of each word in the vocabulary is calculated utilizing softmax. That is, in this case, the possible class is all English words. For example, the calculated probabilities 510 of words in the vocabulary are respectively Zgzzyva: 0%; . . . Storage: 10%; . . . Aardvark: 0.1%. In view of the above, according to the output result of the BERT model, the probability that the original value of the masked word is "storage" is the highest among the probabilities of the words in the vocabulary, that is, the original value of the masked word is most likely "storage." Therefore, the original value of the masked word is predicted to be "storage," and this prediction result is consistent with the word sequence used as an input. It can be seen that the accuracy of prediction is relatively high.

In the NSP model, pairs of sentences are received as an input during BERT training, and it is learned to predict whether the second sentence in the pair is the subsequent sentence in the original document.

In a BERT fine-tuning phase, it is relatively simple to use a pre-trained BERT for specific tasks: the text classification task (such as service request classification) is similar to the next sentence classification, and a classification layer is added before the Transformer output of the [CLS] token.

Figure 6:
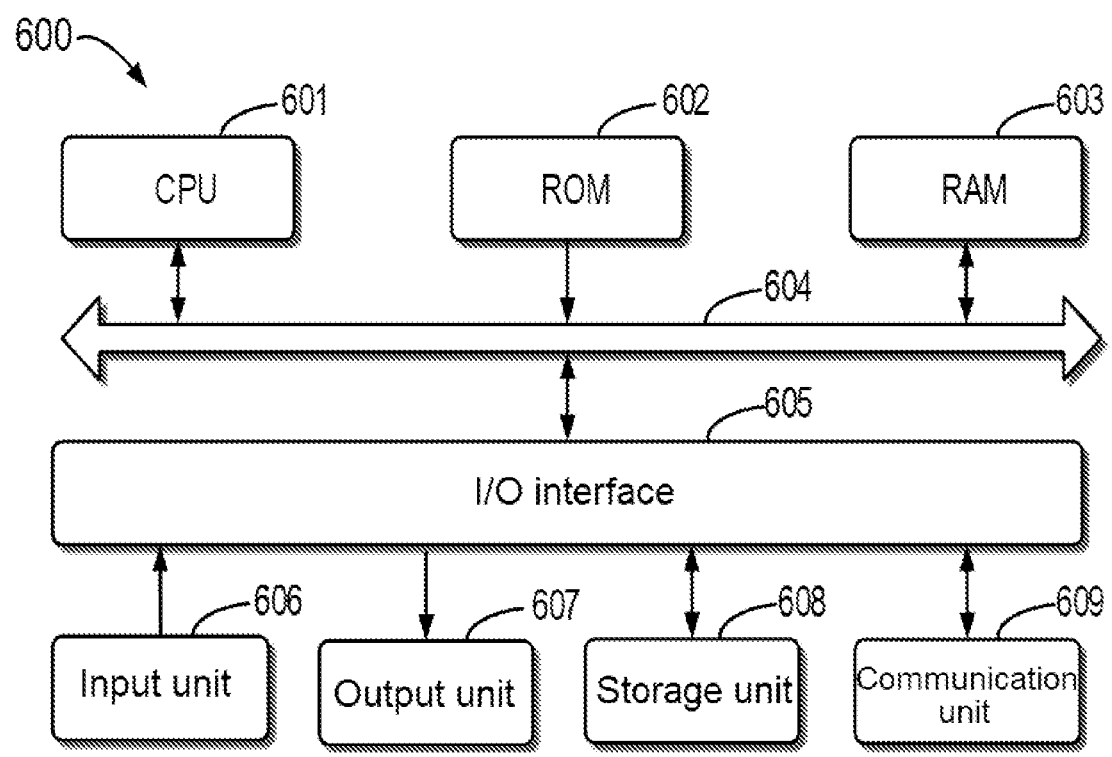
FIG. 6 is a schematic block diagram of a device that may be used to implement embodiments of the present disclosure.

FIG. 6 is a schematic block diagram of device 600 that may be used to implement embodiments of the present disclosure. Device 600 may be a device or an apparatus described in embodiments of the present disclosure. As shown in FIG. 6, device 600 includes central processing unit (CPU) 601 that may perform various appropriate actions and processing according to computer program instructions stored in read-only memory (ROM) 602 or computer program instructions loaded from storage unit 608 to random access memory (RAM) 603. Various programs and data required for the operation of device 600 may also be stored in RAM 603. CPU 601, ROM 602, and RAM 603 are connected to each other through bus 604. Input/output (I/O) interface 605 is also connected to bus 604.

A plurality of components in device 600 are connected to I/O interface 605, including: input unit 606, such as a keyboard and a mouse; output unit 607, such as various types of displays and speakers; storage unit 608, such as a magnetic disk and an optical disc; and communication unit 609, such as a network card, a modem, and a wireless communication transceiver. Communication unit 609 allows device 600 to exchange information/data with other devices via a computer network, such as the Internet, and/or various telecommunication networks.

The various methods or processes described above may be performed by CPU 601. For example, in some embodiments, the methods can be implemented as a computer software program that is tangibly included in a machine-readable medium such as storage unit 608. In some embodiments, part of or all the computer program may be loaded and/or installed onto device 600 via ROM 602 and/or communication unit 609. When the computer program is loaded onto RAM 603 and executed by CPU 601, one or more steps or actions of the methods or processes described above may be performed.

In some embodiments, the methods and processes described above may be implemented as a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electrical storage device, a magnetic storage device, an optical storage device, an electromagnetic storage device, a semiconductor storage device, or any suitable combination of the above. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for performing the operations of the present disclosure may be assembly instructions, Instruction Set Architecture (ISA) instructions, machine instructions, machine-related instructions, microcode, firmware instructions, status setting data, or source code or object code written in any combination of one or more programming languages, including object-oriented programming languages as well as conventional procedural programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions so as to implement various aspects of the present disclosure.

These computer-readable program instructions can be provided to a processing unit of a general-purpose computer, a special-purpose computer, or another programmable data processing apparatus to produce a machine, such that these instructions, when executed by the processing unit of the computer or another programmable data processing apparatus, generate an apparatus for implementing the functions/actions specified in one or more blocks in the flow charts and/or block diagrams. The computer-readable program instructions may also be stored in a computer-readable storage medium. These instructions cause a computer, a programmable data processing apparatus, and/or another device to operate in a particular manner, such that the computer-readable medium storing the instructions includes an article of manufacture which includes instructions for implementing various aspects of the functions/actions specified in one or more blocks in the flow charts and/or block diagrams.

The computer-readable program instructions can also be loaded onto a computer, other programmable data processing apparatuses, or other devices, so that a series of operating steps are performed on the computer, other programmable data processing apparatuses, or other devices to produce a computer-implemented process, such that the instructions executed on the computer, other programmable data processing apparatuses, or other devices implement the functions/actions specified in one or more blocks in the flow charts and/or block diagrams.

The flow charts and block diagrams in the accompanying drawings show the architectures, functions, and operations of possible implementations of the device, the method, and the computer program product according to a plurality of embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, the functions denoted in the blocks may also occur in a sequence different from that shown in the figures. For example, two consecutive blocks may in fact be executed substantially concurrently, and sometimes they may also be executed in a reverse order, depending on the functions involved. It should be further noted that each block in the block diagrams and/or flow charts as well as a combination of blocks in the block diagrams and/or flow charts may be implemented by a dedicated hardware-based system executing specified functions or actions, or by a combination of dedicated hardware and computer instructions.

Various embodiments of the present disclosure have been described above. The above description is illustrative, rather than exhaustive, and is not limited to the disclosed various embodiments. Numerous modifications and alterations will be apparent to persons of ordinary skill in the art without departing from the scope and spirit of the illustrated embodiments. The selection of terms as used herein is intended to best explain the principles and practical applications of the various embodiments and their associated improvements, so as to enable persons of ordinary skill in the art to understand the embodiments disclosed herein.

What is claimed is:

1. A method for fault diagnosis, comprising:
   determining, utilizing a first diagnosis model deployed in a storage system, whether a cause of a fault belongs to environmental factors;
   determining, responsive to determining that the cause of the fault belongs to the environmental factors, whether the fault can be solved locally in the storage system; and
   sending, responsive to determining that the fault cannot be solved locally in the storage system, the fault to a second diagnosis model, wherein the first diagnosis model is obtained by distilling the second diagnosis model;
   wherein the second diagnosis model is deployed in a cloud and comprises a transformer-based model pre-trained using a word-masking technique applied to a training corpus of service requests; and
   wherein the first diagnosis model comprises a compacted version of the pre-trained transformer-based model.

2. The method according to claim 1, wherein determining whether the cause of the fault belongs to environmental factors comprises:
   obtaining a service request of the storage system, wherein the service request comprises a title and description of the fault; and
   determining, based on the service request, whether the cause of the fault belongs to environmental factors.

3. The method according to claim 2, wherein determining whether the fault can be solved locally in the storage system comprises:
   determining, based on a knowledge base, whether the fault can be solved locally in the storage system, wherein the knowledge base stores knowledge references for fixing the fault, and the service request comprises an index to the knowledge base.

4. The method according to claim 3, wherein the second diagnosis model is generated by pre-training the service request utilizing a Masked Language Model and fine tuning the service request marked by the knowledge base.

5. The method according to claim 4, wherein the second diagnosis model is based on a semantic representation model, and the semantic representation model is a Bidirectional Encoder Representation from Transformer model.

6. The method according to claim 1, further comprising:
   sending, responsive to determining that the cause of the fault does not belong to the environmental factors, the fault to the second diagnosis model for diagnosis.

7. The method according to claim 1, further comprising:
   solving the fault locally in the storage system responsive to determining that the fault can be solved locally in the storage system, and resetting the storage system.

8. The method according to claim 1, wherein determining whether the cause of the fault belongs to environmental factors comprises:
   generating a whitelist of environmental factors causing faults during the distillation of the first diagnosis model from the second diagnosis model; and
   searching the whitelist for the cause of the fault.

9. An electronic device, comprising:
   a processing unit; and
   a memory coupled to the processing unit and storing instructions, wherein the instructions, when executed by the processing unit, cause the electronic device to perform actions comprising:
   determining, utilizing a first diagnosis model deployed in a storage system, whether a cause of a fault belongs to environmental factors;
   determining, responsive to determining that the cause of the fault belongs to the environmental factors, whether the fault can be solved locally in the storage system; and
   sending, responsive to determining that the fault cannot be solved locally in the storage system, the fault to a second diagnosis model, wherein the first diagnosis model is obtained by distilling the second diagnosis model;
   wherein the second diagnosis model is deployed in a cloud and comprises a transformer-based model pre-trained using a word-masking technique applied to a training corpus of service requests; and
   wherein the first diagnosis model comprises a compacted version of the pre-trained transformer-based model.

10. The electronic device according to claim 9, wherein determining whether the cause of the fault belongs to environmental factors comprises:
    obtaining a service request of the storage system, wherein the service request comprises a title and description of the fault; and
    determining, based on the service request, whether the cause of the fault belongs to environmental factors.

11. The electronic device according to claim 10, wherein determining whether the fault can be solved locally in the storage system comprises:
    determining, based on a knowledge base, whether the fault can be solved locally in the storage system, wherein the knowledge base stores knowledge references for fixing the fault, and the service request comprises an index to the knowledge base.

12. The electronic device according to claim 11, wherein the second diagnosis model is generated by pre-training the service request utilizing a Masked Language Model and fine tuning the service request marked by the knowledge base.

13. The electronic device according to claim 12, wherein the second diagnosis model is based on a semantic representation model, and the semantic representation model is a Bidirectional Encoder Representation from Transformer model.

14. The electronic device according to claim 9, wherein the instructions, when executed by the processing unit, further cause the electronic device to perform an action comprising:
    sending, responsive to determining that the cause of the fault does not belong to the environmental factors, the fault to the second diagnosis model for diagnosis.

15. The electronic device according to claim 9, wherein the instructions, when executed by the processing unit, further cause the electronic device to perform an action comprising:
    solving the fault locally in the storage system responsive to determining that the fault can be solved locally in the storage system, and resetting the storage system.

16. The electronic device according to claim 9, wherein determining whether the cause of the fault belongs to environmental factors comprises:
    generating a whitelist of environmental factors causing faults during the distillation of the first diagnosis model from the second diagnosis model; and
    searching the whitelist for the cause of the fault.

17. A computer program product that is tangibly stored on a non-transitory computer-readable medium and comprises computer-executable instructions, wherein the computer-executable instructions, when executed by a computer, cause the computer to perform a method for fault diagnosis, the method comprising:
    determining, utilizing a first diagnosis model deployed in a storage system, whether a cause of a fault belongs to environmental factors;
    determining, responsive to determining that the cause of the fault belongs to the environmental factors, whether the fault can be solved locally in the storage system; and
    sending, responsive to determining that the fault cannot be solved locally in the storage system, the fault to a second diagnosis model, wherein the first diagnosis model is obtained by distilling the second diagnosis model;
    wherein the second diagnosis model is deployed in a cloud and comprises a transformer-based model pre-trained using a word-masking technique applied to a training corpus of service requests; and
    wherein the first diagnosis model comprises a compacted version of the pre-trained transformer-based model.

18. The computer program product according to claim 17, wherein determining whether the cause of the fault belongs to environmental factors comprises:
    obtaining a service request of the storage system, wherein the service request comprises a title and description of the fault; and
    determining, based on the service request, whether the cause of the fault belongs to environmental factors.

19. The computer program product according to claim 18, wherein determining whether the fault can be solved locally in the storage system comprises:
    determining, based on a knowledge base, whether the fault can be solved locally in the storage system, wherein the knowledge base stores knowledge references for fixing the fault, and the service request comprises an index to the knowledge base.

20. The computer program product according to claim 19, wherein the second diagnosis model is generated by pre-training the service request utilizing a Masked Language Model and fine tuning the service request marked by the knowledge base.

* * * * *